US011785974B2

(12) United States Patent
Dewille et al.

(10) Patent No.: US 11,785,974 B2
(45) Date of Patent: Oct. 17, 2023

(54) LIQUID NUTRITIONAL COMPOSITIONS CONTAINING OXIDIZABLE FISH OIL, ROSMARINIC ACID, AND FERRIC IRON

(71) Applicant: Abbott Laboratories, Abbott Park, IL (US)

(72) Inventors: Normanella Dewille, Columbus, OH (US); Megan Terp, Columbus, OH (US); Allison Atnip, Columbus, OH (US); Tapas Das, Worthington, OH (US)

(73) Assignee: Abbott Laboratories, Abbott Park, IL (US)

(*) Notice: Subject to any disclaimer, the term of this patent is extended or adjusted under 35 U.S.C. 154(b) by 162 days.

(21) Appl. No.: 16/493,508

(22) PCT Filed: Mar. 27, 2018

(86) PCT No.: PCT/US2018/024454
§ 371 (c)(1),
(2) Date: Sep. 12, 2019

(87) PCT Pub. No.: WO2018/183251
PCT Pub. Date: Oct. 4, 2018

(65) Prior Publication Data
US 2020/0077691 A1    Mar. 12, 2020

Related U.S. Application Data

(60) Provisional application No. 62/480,136, filed on Mar. 31, 2017.

(51) Int. Cl.
| | | |
|---|---|---|
| *A23L 33/12* | (2016.01) | |
| *A23L 33/19* | (2016.01) | |
| *A23L 33/105* | (2016.01) | |
| *A23L 33/16* | (2016.01) | |
| *A23L 33/125* | (2016.01) | |
| *A23L 33/155* | (2016.01) | |

(52) U.S. Cl.
CPC ............ *A23L 33/12* (2016.08); *A23L 33/105* (2016.08); *A23L 33/125* (2016.08); *A23L 33/155* (2016.08); *A23L 33/16* (2016.08); *A23L 33/19* (2016.08); *A23V 2002/00* (2013.01)

(58) Field of Classification Search
CPC ........ A23L 33/12; A23L 33/19; A23L 33/105; A23L 33/16; A23L 33/125; A23L 33/155; A23V 2002/00
USPC ......... 426/426, 74, 545, 648, 601, 642, 656, 426/658, 262
See application file for complete search history.

(56) References Cited

U.S. PATENT DOCUMENTS

| | | |
|---|---|---|
| 6,344,223 B1 | 2/2002 | Rekhif et al. |
| 7,816,404 B2 | 10/2010 | McCall, Jr. |
| 9,241,500 B2 | 1/2016 | Nair et al. |
| 2003/0049352 A1 | 3/2003 | Mehansho et al. |
| 2006/0159724 A1 | 7/2006 | Bell |
| 2006/0240151 A1 | 10/2006 | Walker et al. |
| 2008/0233239 A1 | 9/2008 | Avramis et al. |
| 2008/0274233 A1 | 11/2008 | Avramis et al. |
| 2012/0184760 A1* | 7/2012 | Saebo |
| 2013/0095204 A1 | 4/2013 | Jouni et al. |
| 2015/0246011 A1 | 9/2015 | Walton et al. |
| 2016/0316810 A1* | 11/2016 | Terp et al. |

FOREIGN PATENT DOCUMENTS

| | | |
|---|---|---|
| CN | 105960173 A | 9/2016 |
| EP | 1743530 A1 | 1/2001 |
| EP | 1156719 B1 | 5/2003 |
| EP | 1265498 B1 | 3/2009 |
| WO | 98/48648 A1 | 11/1998 |
| WO | 2006/113819 A1 | 10/2006 |
| WO | 2008/052674 A1 | 5/2008 |
| WO | 2012/120110 A1 | 9/2012 |
| WO | 2013/055439 A1 | 4/2013 |
| WO | 2014/047497 A1 | 3/2014 |
| WO | 2014055905 A1 | 4/2014 |
| WO | 2014144458 A1 | 9/2014 |
| WO | 2015/095545 A1 | 6/2015 |
| WO | 2016/014492 A1 | 1/2016 |
| WO | 2016/014500 A1 | 1/2016 |
| WO | 2016/057818 A1 | 4/2016 |

OTHER PUBLICATIONS

Ferrous Fumarate and Ferric Pyrophosphate as Food Fortificants in Developing Countries. pp. 1-97-2013, https//:clinicaltrials.gov/ct2/show/study/NCT00867#studydesign. (Year: 2013).*
Choe, Eunok et al., Mechanisms and Factors for Edible Oil Oxidation, Comprehensive Reviews in Food Science and Food Safety, vol. 5, pp. 169-186 (2006).
Yu, L. et al., Rosemary Extracts as Inhibitors of Lipid Oxidation and Color Change in Cooked Turkey Products During Refrigerated Storage, Journal of Food Science, vol. 67, No. 2, pp. 582-585 (2002).
Habeych, Edwin et al., Strategies to limit colour changeswhen fortifying food productswith iron, Food Research International, vol. 88, pp. 122-128 (2016).
Gray, Nathan, Iron giant: Nestle aims to iron out discolouration in fortified foods, Food Research International, pp. 1-4 (Jun. 1, 2016).
Search Report from corresponding Chinese Application No. 2018800249449 dated May 30, 2022.
Notice of Opposition of corresponding EP 3599898 B1 dated May 4, 2023.

(Continued)

*Primary Examiner* — Helen F Heggestad
(74) *Attorney, Agent, or Firm* — Porter Wright Morris & Arthur LLP

(57) ABSTRACT

Liquid nutritional compositions have an off-white color with a Hunter L value not less than 68, and comprise (a) a protein; (b) a carbohydrate; (c) an oxidizable fish oil containing an omega-3 polyunsaturated fatty acid; (d) rosmarinic acid; and (e) ferric iron comprising ferric orthophosphate and/or ferric pyrophosphate. The liquid nutritional compositions exhibit reduced off-flavors and aromas typically encountered in compositions including fish oil.

22 Claims, No Drawings

(56) References Cited

OTHER PUBLICATIONS

Opposition against corresponding EP 3599898 B1 (opposed patent) of Abbott Laboratories, by Fresenius Kabi Deutschland GmbH, Ref FK22175-01-OPP-EP, European Patent Office, pp. 1-22 (dated Apr. 27, 2023).

Rosmarin, Wikipedia, https//de.wikipedia.org/wiki/Rosmarin, pp. 1-9, described at p. 6 of the Opposition (dated Mar. 13, 2017; printed Apr. 19, 2023).

Nollet, Leo M.L. et al., Handbook of Analysis of Active Compounds in Functional Foods, CRC Press Taylor & Francis Group LLC, BocaRaton, FL, Chapter 31, pp. 689-722 (2012).

Boroski, Marcela et al., Use of oregano extract and oregano essential oil as antioxidants in functional dairy beverage formulations, LWT—Food Science and Technology, vol. 47, pp. 167-174 (2012).

\* cited by examiner

LIQUID NUTRITIONAL COMPOSITIONS CONTAINING OXIDIZABLE FISH OIL, ROSMARINIC ACID, AND FERRIC IRON

FIELD

The present invention is directed to liquid nutritional compositions having an off-white color and containing an oxidizable fish oil, rosmarinic acid and ferric iron. In additional embodiments, the present invention is directed to methods of reducing discoloration and off-flavors nd aromas in liquid nutritional compositions having an off-white color and comprising an oxidizable fish oil.

BACKGROUND

A growing body of evidence suggests that regular consumption of certain amounts of unsaturated fatty acids, such as omega-3 polyunsaturated fatty acids, may provide various health benefits. An advantageous source of omega-3 polyunsaturated fatty acids is fish oil. As a result, a number of nutritional compositions are being formulated to contain fish oil to provide these unsaturated fatty acids. However, many of these unsaturated fatty acids are prone to oxidation, which often results in highly objectionable off-flavors and aromas that have been described as fishy, painty, or otherwise rancid.

WO 2015/095545 A1 discloses nutritional compositions comprising an oxidizable oil such as fish oil and rosmarinic acid, with the addition of the rosmarinic acid advantageously reducing off-flavors and aromas in a nutritional composition comprising the oxidizable oil. However, certain productions of such compositions, particularly liquid nutritional compositions having an off-white color, such as a vanilla-flavored liquid nutritional composition, have been found to become noticeably and disadvantageously discolored. As consumers expect a nutritional composition to have a color which reflects the flavoring of the composition, the discoloration in such products can render the compositions unacceptable to consumers as it is incongruent with the expected flavor-associated coloring.

Accordingly, a need exists for improved liquid nutritional compositions having an off-white color and which can include oxidizable fish oil and rosmarinic acid to provide the beneficial effects noted above, without causing objectionable off-flavors and aromas and discoloration which render the compositions unacceptable to consumers.

SUMMARY

The present invention overcomes one or more disadvantages of the prior art and provides certain liquid nutritional compositions with improved color stability and good taste and aroma.

In one embodiment, the invention is directed to a liquid nutritional composition having an off-white color with a Hunter L value not less than 68, and comprising (a) a protein; (b) a carbohydrate; (c) an oxidizable fish oil containing an omega-3 polyunsaturated fatty acid; (d) rosmarinic acid; and (e) ferric iron comprising ferric orthophosphate and/or ferric pyrophosphate. The liquid nutritional compositions exhibit reduced off-flavors and aromas typically encountered in compositions including fish oil.

In another embodiment, the invention is directed to a method of reducing discoloration and off-flavor and aroma in a liquid nutritional composition having an off-white color and comprising protein, a carbohydrate and an oxidizable fish oil containing an omega-3 polyunsaturated fatty acid. The method comprises including in the composition rosmarinic acid and ferric iron comprising ferric orthophosphate and/or ferric pyrophosphate, wherein the composition has a Hunter L value not less than 68.

The liquid nutritional compositions and methods of the invention exhibit reduced off-flavors and aromas typically encountered in compositions including fish oil, and avoid discoloration. It has been discovered that by providing at least one of ferric orthophosphate and ferric pyrophosphate, which are insoluble iron supplements, iron fortification can be provided in combination with the advantages of fish oil without significant discoloration in the nutritional composition. As a result, a liquid nutritional composition having an off-white color can be provided with the benefits of both fish oil and iron supplementation, while maintaining the color of the composition consistent with the composition flavoring.

DETAILED DESCRIPTION

While the general inventive concepts are susceptible of embodiment in many different forms, described herein in detail are specific embodiments thereof with the understanding that the present disclosure is to be considered as an exemplification of the principles of the general inventive concepts. Accordingly, the general inventive concepts are not intended to be limited to the specific embodiments illustrated and described herein.

In one embodiment, the invention is directed to liquid nutritional compositions. The term "liquid nutritional composition" as used herein, unless otherwise specified, encompasses all forms of nutritional liquids, including emulsified liquids, and liquids formed by reconstituting nutritional powders, for example, by addition of water. The liquid nutritional compositions are suitable for oral consumption by a human.

All percentages, parts and ratios as used herein, are by weight of the total composition, unless otherwise specified. All such weights as they pertain to listed ingredients are based on the active level and, therefore, do not include solvents or byproducts that may be included in commercially available materials, unless otherwise specified.

The terminology as set forth herein is for description of the embodiments only and should not be construed as limiting the disclosure as a whole. Unless otherwise specified, "a," "an," "the," and "at least one" are used interchangeably. Furthermore, as used in the description and the appended claims, the singular forms "a," "an," and "the" are inclusive of their plural forms, unless the context clearly indicates otherwise.

Throughout this specification, when a range of values is defined with respect to a particular characteristic of the present invention, the present invention relates to and explicitly incorporates every specific subrange therein. Additionally, throughout this specification, when a group of substances is defined with respect to a particular characteristic of the present invention, the present invention relates to and explicitly incorporates every specific subgroup therein. Any specified range or group is to be understood as a shorthand way of referring to every member of a range or group individually as well as every possible subrange and subgroup encompassed therein.

The various embodiments of the nutritional compositions of the present disclosure may also be substantially free of any optional or selected ingredient or feature described herein, provided that the remaining nutritional composition still contains all of the required ingredients or features as described herein. In this context, and unless otherwise specified, the term "substantially free" means that the selected nutritional product contains less than a functional amount of the optional ingredient, typically less than 1%, including less than 0.5%, including less than 0.1%, and also including zero percent, by weight, of such optional or selected essential ingredient.

The nutritional compositions described herein may comprise, consist of, or consist essentially of the essential elements of the compositions as described herein, as well as any additional or optional elements described herein or otherwise useful in nutritional product applications.

Unless otherwise indicated herein, all exemplary embodiments, sub-embodiments, specific embodiments and optional embodiments are respective exemplary embodiments, sub-embodiments, specific embodiments and optional embodiments to all embodiments described herein.

The term "serving" as used herein, unless otherwise specified, refers to an amount which is intended to be consumed by an individual in one sitting or within one hour or less. While the invention is described with respect to a serving of 237 ml (8 ounces) of a liquid nutritional composition, the liquid nutritional compositions of the invention may be provided in smaller or larger servings as desired. It should also be recognized that a liquid nutritional composition according to the invention may comprise a reconstituted liquid composition formed from a powder nutritional composition, for example, by addition of water.

Any combination of method or process steps as used herein may be performed in any order, unless otherwise specified or clearly implied to the contrary by the context in which the referenced combination is made.

In one embodiment, the liquid nutritional compositions of the invention are shelf stable. The term "shelf stable" as used herein, unless otherwise specified, refers to a liquid nutritional composition that remains commercially stable after being packaged and then stored at 18-24° C. for at least 3 months. Such packaging will typically include heat sterilization of the composition, for example, by aseptic or retort methods. Shelf stability may be measured by any suitable indicia of stability including, but not limited to, consumer acceptance panel, sedimentation, etc.

The nutritional compositions of the invention have a neutral pH, i.e., a pH of from about 6 to 8 or, more specifically, from about 6 to 7.5. In specific embodiments, the nutritional compositions have a pH of form about 6.5 to 7.2 or, more specifically, from about 6.8 to 7.1.

The term "oxidizable oil" as used herein, unless otherwise specified, refers to an oil that is susceptible to oxidation by virtue of containing unsaturated fatty acids, particularly polyunsaturated fatty acids. The terms "polyunsaturated fatty acid" and "PUFA" as used herein, unless otherwise specified, refer to any polyunsaturated fatty acid or source thereof, including short chain (less than about 6 carbon atoms per chain), medium chain (about 6 to about 18 carbon atoms per chain), and long chain (having at least about 20 carbon atoms per chain) fatty acids having two or more points of unsaturation (i.e., two or more carbon-carbon double bonds).

In one exemplary embodiment, the liquid nutritional composition has an off-white color with a Hunter L value not less than 68, and comprises (a) a protein; (b) a carbohydrate; (c) an oxidizable fish oil containing an omega-3 polyunsaturated fatty acid; (d) rosmarinic acid; and (e) ferric iron comprising ferric orthophosphate and/or ferric pyrophosphate.

In more specific embodiments, the liquid nutritional composition has a pH of 6 to 8 and/or is in the form of an aqueous emulsion having a continuous aqueous phase and a discontinuous non-aqueous phase.

In more specific embodiments, the liquid nutritional composition comprises 0.0004 wt % to 0.04 wt % rosmarinic acid. In one exemplary embodiment, the rosmarinic acid is provided by a water-soluble rosemary extract.

In more specific embodiments, the protein comprises about 2 wt % to 15 wt % of the liquid nutritional composition, the carbohydrate comprises about 5 wt % to 25 wt % of the liquid nutritional composition. In more specific embodiments embodiment, the liquid nutritional composition comprises about 0.5 wt % to 20 wt % of fat (including the oxidizable oil).

As mentioned, the use of an oxidizable fish oil containing an unsaturated fatty acid can result in the liquid nutritional composition having off-flavors and aromas. Such off-flavors and aromas are often described as fishy, painty, or otherwise rancid, and generally result from the oxidation of the unsaturated fatty acids, particularly polyunsaturated fatty acids, in the oxidizable oil. Rosmarinic acid may be utilized to effectively protect the flavor and aroma of liquid nutritional compositions comprising an oxidizable fish oil containing an unsaturated fatty acid, particularly when the liquid nutritional composition is in the form of an aqueous emulsion and contains omega-3 polyunsaturated fatty acids. The flavor and aroma protection provided by the rosmarinic acid was particularly unexpected because current technologies indicate that rosmarinic acid (a polar, hydrophilic compound) exhibits less antioxidant activity in aqueous emulsion systems than non-polar, oil-soluble compounds, such as carnosic acid and carnosol.

However, certain productions of compositions containing both an oxidizable fish oil containing an unsaturated fatty acid and rosmarinic acid, particularly liquid nutritional compositions having an off-white color, such as a vanilla-flavored liquid nutritional composition, have been found to become noticeably and disadvantageously discolored. It was discovered that discoloration was particularly encountered in such compositions further including mineral fortification, and, specifically, iron fortification with ferrous sulfate. The present compositions and methods, employing ferric iron comprising ferric orthophosphate and/or ferric pyrophosphate, exhibit reduced discoloration. In some embodiments, the present compositions and methods surprisingly provide improved taste attributes as well.

As mentioned, the exemplary liquid nutritional composition includes an oxidizable fish oil containing an omega-3 polyunsaturated fatty acid (PUFA). Exemplary omega-3 PUFAs include, but are not limited to, alpha-linolenic acid (ALA), eicosapentaenoic acid (EPA), and docosahexaenoic acid (DHA). In certain exemplary embodiments, the liquid nutritional composition comprises 0.005 wt % to 5 wt % of omega-3 PUFAs. For example, in certain exemplary embodiments, the liquid nutritional composition comprises 0.005 wt % to 4.75 wt %, including 0.01 wt % to 4.5 wt %, 0.05 wt % to 4 wt %, 0.1 wt % to 3.5 wt %, 0.5 wt % to 3 wt %, 0.75 wt % to 2.5 wt %, 1 wt % to 2 wt %, or 2 wt % to 5 wt % of omega-3 PUFAs. In one exemplary embodiment, the omega-3 PUFA comprises DHA. In one exemplary embodiment, the omega-3 PUFA comprises EPA and DHA. In certain exemplary embodiments, the EPA and DHA are present at a weight ratio of 1:5 to 5:1. For example, in certain embodiments, the weight ratio of EPA to DHA is 1:5 to 5:1, including 1:4 to 4:1, 1:3 to 3:1, or 1:2 to 2:1.

In one exemplary embodiment, the oxidizable oil comprises fish oil containing an omega-3 PUFA. As used herein, the term "fish oil" refers to oil derived from the tissues of oily fish. The fish oil may be provided by saltwater or fresh water fish including, but not limited to, albacore, menhaden, salmon, herring, mackerel, anchovies, and sardines. In certain exemplary embodiments, the fish oil may be a concentrated fish oil. In one exemplary embodiment, the fish oil comprises EPA and DHA. In one exemplary embodiment, the fish oil comprises EPA and DHA at a weight ratio of 1:5 to 5:1 (EPA to DHA). For example, in certain embodiments, the weight ratio of EPA to DHA is 1:5 to 5:1, including 1:4 to 4:1, 1:3 to 3:1, or 1:2 to 2:1. As previously mentioned, omega-3 PUFAs, such as EPA and DHA from fish oil, are particularly susceptible to oxidation, and when oxidized can impart unpleasant off-flavors and aromas (e.g., fishy notes) to the liquid nutritional composition.

In certain exemplary embodiments, the unsaturated fatty acid contained in the oxidizable oil further comprises an omega-6 PUFA. Exemplary omega-6 PUFAs include, but are not limited to, linoleic acid (LA), gamma-linolenic acid (GLA), dihomo-gamma-linolenic acid (DGLA), and arachidonic acid (AA). In certain exemplary embodiments, the liquid nutritional composition comprises 0.005 wt % to 7 wt % of omega-6 PUFAs. For example, in certain exemplary embodiments, the liquid nutritional composition comprises 0.005 wt % to 5 wt % of omega-6 PUFAs, including 0.01 wt % to 4.5 wt %, 0.05 wt % to 4 wt %, 0.1 wt % to 3.5 wt %, 0.5 wt % to 3 wt %, 0.75 wt % to 2.5 wt %, 1 wt % to 2 wt %, or 2 wt % to 7 wt % of omega-6 PUFAs. In one exemplary embodiment, the omega-6 PUFA comprises gamma-linolenic acid.

In certain exemplary embodiments, the unsaturated fatty acid comprises at least one omega-3 PUFA, such as ALA, EPA, and DHA, and at least one omega-6 PUFA, such as LA, GLA, DGLA, and AA. In one exemplary embodiment, the unsaturated fatty acid in the oxidizable oil comprises DHA and GLA. In one exemplary embodiment, the unsaturated fatty acid in the oxidizable oil comprises DHA, GLA, and EPA. It should be understood that the oxidizable oil may comprise one oxidizable oil or multiple (e.g., two, three, four) oxidizable oils.

To provide protection against the oxidation of the oxidizable oil and to reduce or otherwise mask any off-flavors and aromas, the exemplary liquid nutritional composition comprises rosmarinic acid. Rosmarinic acid is a water soluble compound found in a wide variety of plants and is known to exhibit antioxidant activity. By way of example only, rosmarinic acid is found in *Ocimum basilicum* (basil), *Ocimum tenuiflorum* (holy basil), *Melissa officinalis* (lemon balm), *Rosmarinus officinalis* (rosemary), *Origanum majorana* (marjoram), *Salvia officinalis* (sage), *Thymus vulgaris* (thyme), and peppermint. In one exemplary embodiment, the rosmarinic acid in the liquid nutritional composition is provided by a water-soluble rosemary extract. Exemplary water-soluble rosemary extracts include AquaROX™ extract available from Vitiva d.d. (Slovenia), StabilEnhance® WSR extract available from Naturex, Inc. (South Hackensack, N.J.), and Herbalox® Seasoning available from Kalsec, Inc. (Kalamazoo, Mich.). In certain other embodiments, the rosmarinic acid in the liquid nutritional composition may be provided by a water-soluble extract from one or more of the plant species listed above or other plants containing rosmarinic acid.

In one exemplary embodiment, the liquid nutritional composition comprises 0.0004 wt % to 0.04 wt % rosmarinic acid. For example, in certain exemplary embodiments, the liquid nutritional composition comprises 0.001 wt % to 0.02 wt % rosmarinic acid, including 0.002 wt % to 0.012 wt %, 0.004 wt % to 0.01 wt %, or 0.01 wt % to 0.04 wt % rosmarinic acid. This particular concentration range of rosmarinic acid has been found to be particularly effective for reducing or otherwise masking off-flavors and aromas that can develop in liquid nutritional compositions, particularly aqueous emulsions, containing oxidizable oil.

As discussed previously, certain productions of compositions containing both an oxidizable fish oil containing an unsaturated fatty acid and rosmarinic acid, particularly liquid nutritional compositions having an off-white color, such as a vanilla-flavored liquid nutritional composition, have been found to become noticeably and disadvantageously discolored. The discoloration often increases when the composition is heat treated, for example, during processing and/or aseptic or retort sterilization. It was discovered that discoloration was particularly encountered in such compositions further including mineral fortification, and, specifically, iron fortification with ferrous sulfate. The present compositions and methods, employing ferric iron comprising an insoluble source of iron, specifically ferric orthophosphate and/or ferric pyrophosphate, exhibit reduced discoloration. Surprisingly, this type of insoluble iron source provides iron fortification to the nutritional compositions without the discoloration often observed in prior art products and maintains the off-white product color. These improvements are obtained without negatively affecting other properties of the nutritional compositions, even in heat treated compositions, i.e., compositions subjected to sterilization by aseptic or retort methods. For example, the ferric orthophosphate and ferric pyrophosphate do not form noticeable precipitates in the liquid compositions or otherwise interfere with the pleasing mouth feel and taste of the compositions and, in certain compositions, may further improve taste attributes of the liquid nutritional compositions.

The ferric orthophosphate and/or ferric pyrophosphate is included in the nutritional compositions to provide the compositions with nutritional iron fortification. In specific embodiments, the nutritional compositions comprise from about 6 to 60 mg of ferric orthophosphate and/or ferric pyrophosphate per 237 ml serving. In additional embodiments, the nutritional compositions comprise from about 6 to 30 mg, or more specifically, from about 6 to 20 mg, of ferric orthophosphate and/or ferric pyrophosphate per 237 ml serving. In specific embodiments, the ferric orthophosphate and/or ferric pyrophosphate is included in the nutritional compositions in an amount sufficient to provide about 1.8 to 18 mg iron, or, more specifically, about 1.8 to 6 mg iron, per 237 ml serving. The iron fortification is provided while avoiding unacceptable discoloration of an off-white product, for example a vanilla or banana flavored composition, or other flavor normally associated with an off-white or light color. In additional embodiments of the nutritional compositions, the compositions are substantially free of soluble iron components and, in more specific embodiments, the compositions contain less than about 1 mg/kg of soluble iron.

The nutritional composition's resistance to discoloration is quantified using the Hunter color scale parameters. The Hunter color scale is a three-variable scale, using variables L, a, and b, developed to quantify color and to numerically communicate differences in color between two or more materials. The maximum value of the variable L is 100, which represents a perfectly reflecting substrate (e.g., white). The minimum for L is zero and corresponds to black. The a and b values have no specific numerical limits.

Positive values for a represent red, whereas negative values for a represent green. Positive values for b represent yellow and negative values for b represent blue. Delta E is a numerical value that is used in conjunction with the Hunter a, b, and L values to provide a single numerical description for the difference between two colors (or one color and a standard).

In the nutritional compositions of the invention, the ferric orthophosphate and/or ferric pyrophosphate are included in an amount effective to provide the composition with a Hunter L value not less than 68, i.e., to substantially maintain the off-white color of the composition in the presence of the green tea extract. In specific embodiments, the sterilized nutritional composition has a Hunter L value not less than 69, or, even more specifically, not less than 70. Such Hunter L values indicate that the nutritional composition resists significant discoloring. In additional embodiments, the nutritional composition has a Hunter a value within the range of −10 to 10, and a Hunter b value within the range of −5 to 27.

The liquid nutritional compositions also comprise a protein and a carbohydrate, and may include a fat other than the oxidizable oil. A wide variety of sources and types of protein, carbohydrate, and fat can be used in the exemplary liquid nutritional compositions described herein.

In one exemplary embodiment, the liquid nutritional composition includes about 3 grams to 30 grams of protein per serving of the liquid nutritional composition. For example, in certain exemplary embodiments, the liquid nutritional composition includes about 3 grams to 25 grams of protein per serving (e.g., approximately 8 oz. or 237 ml) of the liquid nutritional composition, including about 5 grams to 20 grams, about 5 grams to 15 grams, about 5 grams to 10 grams, or about 15 grams to 25 grams of protein per serving of the liquid nutritional composition.

Alternatively, the amount of protein in the liquid nutritional composition may be expressed in terms of a weight percent (wt %) of the liquid nutritional composition. For example, in one exemplary embodiment, the protein comprises about 2 wt % to 15 wt % of the liquid nutritional composition. In certain exemplary embodiments, the protein comprises about 2 wt % to 10 wt % of the liquid nutritional composition, including about 2 wt % to 8 wt %, about 2 wt % to 5 wt %, about 3 wt % to 10 wt %, about 5 wt % to 10 wt %, or about 8 wt % to 12 wt % of the liquid nutritional composition.

Various sources of protein, including one source or more than one source, may be utilized in the exemplary liquid nutritional composition. For example, the source of protein may include, but is not limited to, intact, hydrolyzed, and partially hydrolyzed protein, which may be derived from any known or otherwise suitable source such as milk (e.g., casein, whey), animal (e.g., meat, fish), cereal (e.g., rice, corn), vegetable (e.g., soy, pea), and combinations thereof. The source of protein may also include a mixture amino acids (often described as free amino acids) known for use in nutritional products or a combination of such amino acids with the intact, hydrolyzed, and partially hydrolyzed proteins described herein. The amino acids may be naturally occurring or synthetic amino acids.

More particular examples of sources of protein which may be suitable for use in the exemplary liquid nutritional compositions described herein include, but are not limited to, whole egg powder, egg yolk powder, egg white powder, whey protein, whey protein concentrates, whey protein isolates, whey protein hydrolysates, acid caseins, casein protein isolates, sodium caseinates, calcium caseinates, potassium caseinates, casein hydrolysates, milk protein concentrates, milk protein isolates, milk protein hydrolysates, nonfat dry milk, condensed skim milk, whole cow's milk, partially or completely defatted milk, coconut milk, soy protein concentrates, soy protein isolates, soy protein hydrolysates, pea protein concentrates, pea protein isolates, pea protein hydrolysates, rice protein concentrate, rice protein isolate, rice protein hydrolysate, collagen proteins, collagen protein isolates, meat proteins such as beef protein isolate and/or chicken protein isolate, potato proteins, earthworm proteins, insect proteins, and combinations thereof. The nutritional compositions can include any individual source of protein or combination of any of the various sources of protein listed above.

In one exemplary embodiment, the liquid nutritional composition includes about 15 grams to 110 grams of carbohydrate per serving (e.g., approximately 8 oz. or 237 ml) of the liquid nutritional composition. For example, in certain exemplary embodiments, the liquid nutritional composition includes about 25 grams to 90 grams of carbohydrate per serving of the liquid nutritional composition, including about 30 grams to 85 grams, about 35 grams to 75 grams, or about 40 grams to 60 grams of carbohydrate per serving of the liquid nutritional composition.

Alternatively, the amount of carbohydrate in the liquid nutritional composition may be expressed in terms of a weight percent of the liquid nutritional composition. For example, in one exemplary embodiment, the carbohydrate comprises about 5 wt % to 25 wt % of the liquid nutritional composition. In certain exemplary embodiments, the carbohydrate comprises about 5 wt % to 20 wt % of the liquid nutritional composition, including about 5 wt % to 15 wt %, about 5 wt % to 10 wt %, about 10 wt % to 25 wt %, about 10 wt % to 20 wt %, about 15 wt % to 25 wt %, or about 20 wt % to 25 wt % of the liquid nutritional composition.

Carbohydrates suitable for use in the exemplary liquid nutritional compositions described herein may be simple, complex, variations, or combinations thereof. Various sources of carbohydrate may be used so long as the source is suitable for use in a liquid nutritional composition and is otherwise compatible with any other selected ingredients or features present in the liquid nutritional composition. Non-limiting examples of a source of carbohydrate suitable for use in the exemplary liquid nutritional compositions described herein include maltodextrin, hydrolyzed or modified starch, hydrolyzed or modified cornstarch, glucose polymers such as polydextrose and dextrins, corn syrup, corn syrup solids, rice-derived carbohydrates such as rice maltodextrin, brown rice mild powder and brown rice syrup, sucrose, glucose, fructose, lactose, high fructose corn syrup, honey, sugar alcohols (e.g., maltitol, erythritol, sorbitol), isomaltulose, sucromalt, pullulan, potato starch, corn starch, fructooligosaccharides, galactooligosaccharides, oat fiber, soy fiber, gum arabic, sodium carboxymethylcellulose, methylcellulose, guar gum, gellan gum, locust bean gum, konjac flour, hydroxypropyl methylcellulose, tragacanth gum, karaya gum, gum acacia, chitosan, arabinoglactins, glucomannan, xanthan gum, alginate, pectin, low methoxy pectin, high methoxy pectin, cereal beta-glucans, carrageenan, psyllium, Fibersol™, fruit puree, vegetable puree, isomalto-oligosaccharides, monosaccharides, disaccharides, tapioca-derived carbohydrates, inulin, other resistant starches, and artificial sweeteners, and combinations thereof. The liquid nutritional compositions may include any individual source of carbohydrate or combination of any of the various sources of carbohydrate listed above.

The term "fat" as used herein, unless otherwise specified, refers to lipids, fats, oils, and combinations thereof. In one exemplary embodiment, the liquid nutritional composition includes about 0.5 grams to 50 grams of fat (including the oxidizable oil) per serving (e.g., approximately 8 oz. or 237 ml) of the liquid nutritional composition. For example, in certain exemplary embodiments, the liquid nutritional composition includes about 1 gram to 46 grams of fat per serving of the liquid nutritional composition, including about 1.25 grams to 40 grams, about 5 grams to 35 grams, about 10 grams to 25 grams, about 15 gram to 20 grams, v1 gram to 5 grams, about 20 grams to 50 grams, about 30 grams to 50 grams, or about 40 grams to 50 grams of fat per serving of the liquid nutritional composition.

Alternatively, the amount of fat in the liquid nutritional composition may be expressed in terms of a weight percent of the liquid nutritional composition. For example, in one exemplary embodiment, the fat (including the oxidizable oil) comprises about 0.5 wt % to 20 wt % of the liquid nutritional composition. In certain exemplary embodiments, the fat comprises about 0.5 wt % to 18 wt % of the liquid nutritional composition, including about 0.5 wt % to 15 wt %, about 0.5 wt % to 10 wt %, about 0.5 wt % to 5 wt %, about 2 wt % to 8 wt %, about 5 wt % to 10 wt %, about 8 wt % to 12 wt %, or about 12 wt % to 18 wt % of the liquid nutritional composition. In certain other exemplary embodiments, the fat (including the oxidizable oil) comprises about 15 wt % to 20 wt % of the liquid nutritional composition.

As previously discussed, the exemplary liquid nutritional composition includes an oxidizable fish oil. Accordingly, the liquid nutritional composition may include any one or more of the oxidizable fish oils previously discussed as a source of fat. In addition, in one exemplary embodiment, the liquid nutritional composition includes at least one fat, or source thereof, in combination with the oxidizable fish oil. For example, in one exemplary embodiment, the fat in the liquid nutritional composition further comprises one or more additional oxidizable oils suitable for use in the liquid nutritional composition including, but not limited to, algal oil, canola oil, flaxseed oil, borage oil, safflower oil, high oleic safflower oil, high gamma-linolenic acid (GLA) safflower oil, corn oil, soy oil, sunflower oil, high oleic sunflower oil, and cottonseed oil. One or more additional fats may be also or alternatively be included, for example, a fat selected from the coconut oil, fractionated coconut oil, medium chain triglycerides (MCT) oil, palm oil, palm kernel oil, palm olein, and combinations thereof. In addition, any combination of the preceding exemplary oils and fats may be used in the liquid nutritional composition.

The concentration and relative amounts of protein, carbohydrate, and fat in the exemplary liquid nutritional compositions can vary considerably depending upon, for example, the specific dietary needs of the intended user. In one exemplary embodiment, the liquid nutritional composition comprises protein in an amount of about 2 wt % to 15 wt % of the liquid nutritional composition, carbohydrate in an amount of about 5 wt % to 25 wt % of the liquid nutritional composition, and fat (including the oxidizable oil) in an amount of about 0.5 wt % to 12 wt % of the liquid nutritional composition. In certain exemplary embodiments, the amount of protein, carbohydrate, and fat in the exemplary liquid nutritional composition may alternatively be expressed in terms of the percentage of total calories provided by the particular macronutrient, or a concentration (e.g., grams of macronutrient per 100 mL of the liquid nutritional composition), as shown below in Table 1.

TABLE 1

| Macronutrient | Embodiments | | |
| --- | --- | --- | --- |
| | A | B | C |
| Protein - % of total calories | 5-40 | 10-30 | 15-25 |
| Carbohydrate - % of total calories | 10-70 | 20-60 | 40-60 |
| Fat* - % of total calories | 10-65 | 10-50 | 15-35 |
| Protein - g/100 mL | 0.5-30 | 1-15 | 2-10 |
| Carbohydrate - g/100 mL | 1-40 | 4-30 | 10-20 |
| Fat* - g/100 mL | 0.1-30 | 0.5-15 | 1-5 |

*Fat includes the oxidizable oil.

A serving of the liquid nutritional composition may vary widely depending on, for example, the intended user. For example, a serving of the liquid nutritional composition may be 30 milliliters (mL) to 500 mL (~1 fl oz to ~17 fl oz). In certain exemplary embodiments, a serving of the liquid nutritional composition is 110 mL to 500 mL (~3.7 fl oz to ~17 fl oz), including 110 mL to 417 mL (~3.7 fl oz to ~14 fl oz), 120 mL to 500 mL (~4 fl oz to ~17 fl oz), 120 mL to 417 mL (~4 fl oz to ~14 fl oz), 177 mL to 417 mL (~6 fl oz to ~14 fl oz), 207 mL to 296 mL (~7 fl oz to ~10 fl oz), 230 mL to 245 mL (~7.7 fl oz to ~8.2 fl oz), 110 mL to 237 mL (~3.7 fl oz to ~8 fl oz), 120 mL to 237 mL (~4 fl oz to ~8 fl oz), 110 mL to 150 mL (~3.7 fl oz to ~5 fl oz), or 120 mL to 150 mL (~4 fl oz to ~5 fl oz). Generally as used herein, a serving may be construed as any amount which is intended to be consumed in one sitting or within one hour or less.

The exemplary liquid nutritional compositions described herein are useful to provide supplemental, primary, or sole sources of nutrition. In one exemplary embodiment, the liquid nutritional composition has a caloric density of 0.5 kcal/mL to 3 kcal/mL. In certain exemplary embodiments, the liquid nutritional composition has a caloric density of 0.5 kcal/mL to 2.5 kcal/mL, including 0.5 kcal/mL to 2 kcal/mL, 0.5 kcal/mL to 1.5 kcal/mL, 0.5 kcal/mL to 1 kcal/mL, 0.5 kcal/mL to 0.8 kcal/mL, 1 kcal/mL to 3 kcal/mL, 1.5 kcal/mL to 3 kcal/mL, 2 kcal/mL to 3 kcal/mL, or 2.5 kcal/mL to 3 kcal/mL.

In one exemplary embodiment, the liquid nutritional composition includes at least one antioxidant in addition to the rosmarinic acid. For example, in certain exemplary embodiments, the liquid nutritional composition further comprises at least one antioxidant selected from the group consisting of ascorbic acid, ascorbyl palmitate, retinyl palmitate, tocopherols, ascorbate salts, carotenoids, oil-soluble rosemary extract, and combinations thereof. Tocopherols suitable for use in the liquid nutritional composition may be natural or synthetic and include, but are not limited to, alpha-tocopherol, d-alpha-tocopherol (RRR-alpha-tocopherol), beta-tocopherol, gamma-tocopherol, delta-tocopherol, d,l-alpha-tocopherol (All-rac-alpha-tocopherol), tocopherol acetate, and combinations thereof. The term "tocopherol" as used herein, unless otherwise specified, also includes tocotrienols. Carotenoids suitable for use in the liquid nutritional composition include, but are not limited to, beta-carotene, lutein, lycopene, zeaxanthin, and combinations thereof. The oil-soluble rosemary extract includes carnosic acid and carnosol as active ingredients. Exemplary oil-soluble rosemary extracts include SyneROX™ extract available from Vitiva d.d. (Slovenia) and StabilEnhance® OSR extract available from Naturex, Inc. (South Hackensack, N.J.).

In one exemplary embodiment, the liquid nutritional composition may further comprise one or more additional components that may modify the physical, chemical, aesthetic, or processing characteristics of the liquid nutritional composition or serve as additional nutritional components. Non-limiting examples of additional components include preservatives, emulsifying agents (e.g., lecithin), buffers, sweeteners including artificial sweeteners (e.g., saccharine, aspartame, acesulfame K, sucralose), colorants, flavorants, thickening agents, stabilizers, and so forth.

In one exemplary embodiment, the liquid nutritional composition may further include vitamins or related nutrients, non-limiting examples of which include vitamin A, vitamin $B_{12}$, vitamin C, vitamin D, vitamin K, thiamine, riboflavin, pyridoxine, niacin, folic acid, pantothenic acid, biotin, choline, inositol, salts and derivatives thereof, and combinations thereof. The water soluble vitamins may be added as in the form of a water-soluble vitamin (WSV) premix and/or oil-soluble vitamins may be added in one or more oil carriers as desired.

In one exemplary embodiment, the liquid nutritional composition may further include minerals, non-limiting examples of which include calcium, phosphorus, magnesium, zinc, manganese, sodium, potassium, molybdenum, chromium, chloride, and combinations thereof.

In a further embodiment, the invention is directed to a method of reducing discoloration and off-flavor and aroma in a liquid nutritional composition having an off-white color and comprising protein, a carbohydrate and an oxidizable fish oil containing an omega-3 polyunsaturated fatty acid. The method comprises the step of including in the composition rosmarinic acid and ferric iron comprising ferric orthophosphate and/or ferric pyrophosphate, wherein the composition has a Hunter L value not less than 68. Any of the exemplary liquid nutritional compositions described herein may be prepared in accordance with this exemplary method.

In a specific embodiment, the method may comprise (a) preparing an aqueous solution comprising protein, carbohydrate, and rosmarinic acid; (b) preparing an oil blend comprising an oxidizable oil containing an unsaturated fatty acid; and (c) mixing together the aqueous solution and the oil blend to form the liquid nutritional composition, with addition of the ferric iron at any suitable step in the method. Any of the exemplary liquid nutritional compositions described herein may be prepared in accordance with this exemplary method.

In a specific embodiment, preparing the aqueous solution may comprise: (a) preparing a protein slurry comprising water and protein: (b) preparing a carbohydrate slurry comprising water and carbohydrate; (c) mixing together the protein slurry and the carbohydrate slurry to form the aqueous solution; and (d) adding a source of rosmarinic acid to at least one of the protein slurry, the carbohydrate slurry, and the aqueous solution such that the aqueous solution comprises 0.0004 wt % to 0.2 wt % of rosmarinic acid. In certain exemplary embodiments, a source of rosmarinic acid is added to at least one of the protein slurry, the carbohydrate slurry, and the aqueous solution such that the aqueous solution comprises 0.001 wt % to 0.2 wt % of rosmarinic acid, including 0.005 wt % to 0.15 wt %, 0.01 wt % to 0.1 wt %, 0.05 wt % to 0.15 wt %, or 0.1 wt % to 0.2 wt %. The protein slurry may be prepared, according to one exemplary embodiment, by heating the required amount of water to a temperature of 60° C. to 70° C. and mixing in the required amount of protein. The protein may be one or more of the proteins described herein, such as sodium caseinate, hydrolyzed sodium caseinate, and whey protein concentrate. The carbohydrate slurry may be prepared, according to one exemplary embodiment, by heating the required amount of water to a temperature of 60° C. to 75° C. and mixing in the required amount of carbohydrate. The carbohydrate may be one or more of the carbohydrates described herein, such as maltodextrin, sucrose, fructooligosaccharides, soy fiber, gum arabic, gellan gum, and so forth. In addition, the carbohydrate slurry may include minerals, including ferric iron, preservatives, stabilizers, thickeners, and so forth.

In one exemplary embodiment, the source of rosmarinic acid is added to the protein slurry prior to forming the aqueous solution by mixing together the protein slurry and the carbohydrate slurry. In one exemplary embodiment, the source of rosmarinic acid is added to the carbohydrate slurry prior to forming the aqueous solution by mixing together the protein slurry and the carbohydrate slurry. In one exemplary embodiment, the source of rosmarinic acid is added to the aqueous solution, which is formed by mixing together the protein slurry and the carbohydrate slurry. The source of rosmarinic acid may be any of the sources described herein. In one exemplary embodiment, the source of rosmarinic acid is a water-soluble rosemary extract.

The oil blend comprising an oxidizable fish oil containing an unsaturated fatty acid may be prepared, according to one exemplary embodiment, by heating the required amount of fats and oxidizable oils to a temperature of 25° C. to 35° C., and mixing in an emulsifying agent, such as lecithin. In certain exemplary embodiments, the oil blend further comprises at least one antioxidant. The fats and oxidizable oils may be one or more of the fats and oxidizable oils described herein, such as fish oil, fractionated coconut oil, canola oil, soy oil, and so forth. Similarly, the at least one antioxidant may be one or more of the antioxidants described herein, such as ascorbyl palmitate, mixed tocopherols, oil-soluble rosemary extract, and so forth. In addition, the oil blend may further comprise oil soluble vitamins including, but not limited to, vitamin A, vitamin D, vitamin E, vitamin K, and combinations thereof.

It should be understood that when discussing the liquid nutritional compositions disclosed herein, the discussion is equally applicable to nutritional compositions that are produced according to the exemplary methods described herein. In other words, in certain exemplary embodiments, the exemplary methods can be viewed as methods for preparing the exemplary liquid nutritional compositions described herein. However, it should also be understood that the exemplary methods described herein can also be used to prepare nutritional compositions that vary in one or more ways from the exemplary liquid nutritional compositions described herein.

In one exemplary embodiment, the aqueous solution and the oil blend are blended together with heat and agitation to form the liquid nutritional composition. In one exemplary embodiment, the pH of the liquid nutritional composition may be adjusted to the desired pH range (e.g., from 6.8 to 7). In one exemplary embodiment, the liquid nutritional composition is heat treated and homogenized. For example, the heat treatment is utilized to sterilize the liquid nutritional composition, and may be performed, for example, by high-temperature short-time ("HTST") processing or ultra-high temperature processing ("UHT"). Following heat treatment and homogenization, a water soluble vitamin solution may be added (if applicable), and the pH may be adjusted (if necessary), flavorant may be added, and any additional water may be added to adjust the solids content to the desired range. At this point, the liquid nutritional composition may optionally be packaged and sterilized according to any suitable sterilization technique (e.g., aseptic, retort, hot-fill, chemical, radiation, and filtering sterilization techniques).

EXAMPLE

The following example illustrates certain exemplary embodiments of the liquid nutritional compositions described herein. The examples are given solely for the purpose of illustration and are not to be construed as limitations of the general inventive concepts, as many variations thereof are possible without departing from the spirit and scope of the general inventive concepts.

Examples 1-2

An exemplary liquid nutritional composition is presented in Table 2, in which all ingredient amounts are listed as kilogram per 1000 kg batch of the liquid nutritional composition, unless otherwise indicated.

TABLE 2

| INGREDIENTS | Amount (kg/1000 kg) |
| --- | --- |
| Water | 651.2 |
| Corn Syrup | 120.7 |
| Sucrose | 76.0 |
| Milk Protein Concentrate 80% | 42.6 |
| Sodium Caseinate | 21.9 |
| L-Arginine | 16.4 |
| Marine oil (50% omega-3 sardine oil) | 13.1 |
| Canola oil | 10.6 |
| Fract. coconut (MCT) oil | 10.3 |
| Nutriloid arabic gum | 9.0 |
| Fructooligosaccharide Powder | 8.0 |
| Citric Acid | 5.5 |
| Flavorings | 3.0 |
| Magnesium Chloride | 2.2 |
| Sodium Citrate | 1.8 |
| Potassium Citrate | 1.6 |
| Soy Lecithin | 1.4 |
| Potassium Phosphate Dibasic | 1.4 |
| Rosmarinic Acid (AquaRox 6) | 600.0 g |
| Choline Chloride | 536.8 g |
| Dairy Cream | 500.0 g |
| Ascorbic Acid | 281.9 g |
| Micronized Tricalcium Phosphate | 272.0 g |
| Potassium Hydroxide (45%) | 197.4 g |
| UTM/TM Premix | 161.1 g |
| WSV Premix | 157.3 g |
| Potassium Chloride | 116.7 g |
| Vitamin DEK | 90.0 g |
| Sodium Chloride | 91.5 |
| Gellan Gum | 60.0 |
| Silicon antifoam | 50.0 |
| Ascorbyl Palmitate | 45.5 g |
| Beta Carotene (30%) | 11.2 g |
| Tocopherol-2 (mixed tocopherols) | 7.1 g |
| Vitamin A Palmitate | 6.4 g |
| Vitamin D Oil Soluble | 0.582 g |
| Potassium Iodide | 0.332 g |

Using liquid nutritional compositions of the formula set forth in Table 2, as Control A was employed without further modification. Two inventive compositions B and C were prepared by including ferric pyrophosphate and ferric orthophosphate, respectively. A comparative composition D was prepared by including ferrous sulfate. The compositions were subjected to measurement of the Hunter L, a and b values upon production to assess color stability and were subjected to sensory testing both at production (0 M) and after 4 months storage (4 M) by skilled sensory evaluators. The results are set forth in Table 3:

TABLE 3

| Sample ID | Iron source | 0-Time Hunter LAB scores | "Fishy" score | Metallic score |
| --- | --- | --- | --- | --- |
| A | None | L: 71.02<br>A: 1.46<br>B: 26.5 | 0 M: 0<br>4 M: 0 | 0 M: 0<br>4 M: 0 |
| B | Ferric pyrophosphate | L: 69.37<br>A: 1.14<br>B: 24.91 | 0 M: 1½<br>4 M: 1½ | 0 M: 1<br>4 M: 1 |
| C | Ferric orthophosphate | L: 69.61<br>A: 1.10<br>B: 25.11 | 0 M: 1<br>4 M: 1 | 0 M: 1<br>4 M: ½ |
| D | Ferrous sulfate | L: 66.45<br>A: 0.23<br>B: 22.5 | 0 M: 1<br>4 M: 1 | 0 M: 1<br>4 M: 1 |

The 0-time Hunter L, a and b values show that the inventive compositions B and C exhibited good color stability and reduced variation of the L, a and b values as compared with comparative composition D. Additionally, compositions B and C exhibited good taste attributes, with Composition C (ferric orthophosphate) exhibiting better overall sensory results in view of the lower fishy scores at 0 M and 4 M and lower metallic score at 4 M.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, Therefore, the application, in its broader aspects, is not limited to the specific details, the representative compositions and processes, and illustrative examples shown and described. Accordingly, departures may be made from such details without departing from the spirit or scope of the general inventive concept.

What is claimed is:

1. An iron-fortified liquid nutritional composition having an off-white color and comprising:
   (a) about 2 wt % to 15 wt % of protein;
   (b) about 5 wt % to 25 wt % of carbohydrate;
   (c) about 0.5 wt % to 20 wt % of fat, wherein the fat includes oxidizable fish oil containing an omega-3 polyunsaturated fatty acid;
   (d) 0.0004 wt % to 0.04 wt % rosmarinic acid; and
   (e) iron fortification consisting of insoluble ferric iron in the form of ferric orthophosphate and/or ferric pyrophosphate,
   wherein the insoluble ferric iron in the form of ferric orthophosphate and/or ferric pyrophosphate provides about 1.8 to 18 mg of iron per 237 ml serving, and
   wherein the composition has a Hunter L value not less than 68.

2. The liquid nutritional composition of claim 1, wherein the rosmarinic acid is provided as a water-soluble rosemary extract.

3. The liquid nutritional composition of claim 1, wherein the omega-3 polyunsaturated fatty acid comprises docosahexaenoic acid.

4. The liquid nutritional composition of claim 1, wherein the omega-3 polyunsaturated fatty acid comprises eicosapentaenoic acid and docosahexaenoic acid.

5. The liquid nutritional composition of claim 4, wherein a weight ratio of eicosapentaenoic acid to docosahexaenoic acid is 1:5 to 5:1.

6. The liquid nutritional composition of claim 1, further comprising an omega-6 polyunsaturated fatty acid.

7. The liquid nutritional composition of claim 6, wherein the omega-6 polyunsaturated fatty acid comprises gamma-linolenic acid.

8. The liquid nutritional composition of claim 1, comprising from about 1.8 to 6 mg of iron per 237 ml serving.

9. The liquid nutritional composition of claim 1, wherein the composition has a Hunter a value within the range of −10 to 10, and a Hunter b value within the range of −5 to 27.

10. The liquid nutritional composition of claim 1, wherein the composition has a pH of 6 to 8.

11. The liquid nutritional composition of claim 1, wherein the protein is selected from the group consisting of whey protein concentrates, whey protein isolates, whey protein hydrolysates, acid caseins, sodium caseinates, calcium caseinates, potassium caseinates, casein hydrolysates, milk protein concentrates, milk protein isolates, milk protein hydrolysates, nonfat dry milk, condensed skim milk, soy protein concentrates, soy protein isolates, soy protein hydrolysates, pea protein concentrates, pea protein isolates, pea protein hydrolysates, collagen proteins, collagen protein isolates, rice proteins, potato proteins, earthworm proteins, insect proteins, and combinations thereof.

12. The liquid nutritional composition of claim 1, wherein the carbohydrate is selected from the group consisting of maltodextrin, hydrolyzed starch, glucose polymers, corn syrup, corn syrup solids, rice-derived carbohydrates, sucrose, glucose, fructose, lactose, high fructose corn syrup, honey, sugar alcohols, isomaltulose, sucromalt, pullulan, potato starch, corn starch, fructooligosaccharides, galactooligosaccharides, oat fiber, soy fiber, gum arabic, sodium carboxymethylcellulose, methylcellulose, guar gum, gellan gum, locust bean gum, konjac flour, hydroxypropyl methylcellulose, tragacanth gum, karaya gum, gum acacia, chitosan, arabinoglactins, glucomannan, xanthan gum, alginate, pectin, low methoxy pectin, high methoxy pectin, cereal beta-glucans, carrageenan, psyllium, and combinations thereof.

13. The liquid nutritional composition of claim 1, further comprising a fat selected from the group consisting of coconut oil, fractionated coconut oil, medium chain triglycerides (MCT) oil, canola oil, palm oil, palm kernel oil, palm olein, and combinations thereof.

14. The liquid nutritional composition of claim 13, wherein the fat and the oxidizable fish oil comprise about 0.5 wt % to 20 wt % of the liquid nutritional composition.

15. The liquid nutritional composition of claim 1, further comprising at least one antioxidant selected from the group consisting of ascorbic acid, ascorbyl palmitate, retinyl palmitate, tocopherols, ascorbate salts, carotenoids, oil-soluble rosemary extract, and combinations thereof.

16. The liquid nutritional composition of claim 1, wherein the liquid nutritional composition has a caloric density of 0.5 kcal/mL to 3 kcal/mL.

17. The liquid nutritional composition of claim 1, wherein the liquid nutritional composition is in the form of an aqueous emulsion having a continuous aqueous phase and a discontinuous non-aqueous phase.

18. A method of reducing discoloration and off-flavor and aroma in an iron fortified liquid nutritional composition having an off-white color and comprising about 2 wt % to 15 wt % protein, about 5 wt % to 25 wt % carbohydrate, and about 0.5 wt % to 20 wt % of fat, wherein the fat includes an oxidizable fish oil containing an omega-3 polyunsaturated fatty acid, the method comprising including in the composition 0.0004 wt % to 0.04 wt % rosmarinic acid, and iron fortification consisting of insoluble ferric iron in the form of ferric orthophosphate and/or ferric pyrophosphate, wherein the insoluble ferric iron in the form of ferric orthophosphate and/or ferric pyrophosphate provides about 1.8 to 18 mg of iron per 237 ml serving, and wherein the composition has a Hunter L value not less than 68.

19. The liquid nutritional composition of claim 1, wherein the protein comprises milk protein concentrate, the carbohydrate comprises corn syrup and sucrose, and the fat further includes canola oil and fractionated coconut oil.

20. The liquid nutritional composition of claim 1, comprising from about 6 to 30 mg of ferric orthophosphate and/or ferric pyrophosphate per 237 ml serving.

21. The liquid nutritional composition of claim 1, wherein the composition is heat sterilized.

22. An iron-fortified liquid nutritional composition having an off-white color and comprising:
(a) about 2 wt % to 15 wt % of protein comprising milk protein concentrate;
(b) about 5 wt % to 25 wt % of carbohydrate comprising corn syrup and sucrose;
(c) about 0.5 wt % to 20 wt % of fat, wherein the fat includes (i) oxidizable fish oil containing an omega-3 polyunsaturated fatty acid, (ii) canola oil, and (iii) fractionated coconut oil;
(d) 0.0004 wt % to 0.04 wt % rosmarinic acid provided as a water-soluble rosemary extract; and
(e) iron fortification consisting of insoluble ferric iron in the form of ferric orthophosphate and/or ferric pyrophosphate,
wherein the insoluble ferric iron in the form of ferric orthophosphate and/or ferric pyrophosphate provides about 1.8 to 18 mg of iron per 237 ml serving,
wherein the composition has a Hunter L value not less than 68 and is heat sterilized.

* * * * *